(12) United States Patent
Calisti et al.

(10) Patent No.: US 12,514,856 B2
(45) Date of Patent: Jan. 6, 2026

(54) PEDIATRIC TRAZODONE COMPOSITIONS AND METHOD OF TREATMENT THEREOF

(71) Applicant: ANGELINI S.p.A., Rome (IT)

(72) Inventors: Fabrizio Calisti, Rome (IT); Lorella Ragni, Chiaravalle (IT); Serena Tongiani, Grottaferrata (IT); Rossella Picollo, Rome (IT); Laura Oggianu, Rome (IT)

(73) Assignee: ANGELINI S.p.A., Rome (IT)

( * ) Notice: Subject to any disclaimer, the term of this patent is extended or adjusted under 35 U.S.C. 154(b) by 919 days.

(21) Appl. No.: 17/763,037

(22) PCT Filed: Sep. 25, 2020

(86) PCT No.: PCT/EP2020/077017
§ 371 (c)(1),
(2) Date: Mar. 23, 2022

(87) PCT Pub. No.: WO2021/058810
PCT Pub. Date: Apr. 1, 2021

(65) Prior Publication Data
US 2022/0331312 A1    Oct. 20, 2022

Related U.S. Application Data

(60) Provisional application No. 62/906,166, filed on Sep. 26, 2019.

(51) Int. Cl.
*A61K 31/497* (2006.01)
*A61K 9/00* (2006.01)
*A61P 25/20* (2006.01)

(52) U.S. Cl.
CPC .......... *A61K 31/497* (2013.01); *A61K 9/0095* (2013.01); *A61P 25/20* (2018.01); *A61K 9/0053* (2013.01)

(58) Field of Classification Search
CPC ..................................................... A61P 25/20
See application file for complete search history.

(56) References Cited

U.S. PATENT DOCUMENTS

| 2007/0128275 | A1 | 6/2007 | Gervais et al. | |
|---|---|---|---|---|
| 2010/0256159 | A1* | 10/2010 | Marchetti | A61K 31/495 514/253.04 |
| 2011/0015205 | A1 | 1/2011 | Gervais et al. | |

FOREIGN PATENT DOCUMENTS

| WO | WO 2009/016069 A2 | 2/2009 |
|---|---|---|
| WO | WO 2009/019133 A1 | 2/2009 |

OTHER PUBLICATIONS

Sleep in Children with Neurodevelopmental Disabilities Angriman et al. Neuropediatrics vol. 46 No. Mar. 2015 (Year: 2015).*
Sleep Disturbance and Rage Attacks in Opsoclonus-Myoclonus Syndrome: Response to Trazodone Pranzatelli et al. The Journal of Pediatrics Sep. 2005 (Year: 2005).*
Office Action issued Nov. 3, 2022 in Eurasian Patent Organization Application No. 202290952 (with English translation), 7 pages.
N.Yu. Borovkova, et al., "Current Approaches to the Therapy of Rett's Syndrome (A Review OF Literature)", Russian Journal of Child Neurology, vol. 10, (4), 2015, pp. 43-46.
International Search Report issued Dec. 17, 2020 in PCT/EP2020/077017, 4 pages.
Bruni, O., et al., "Practitioner Review: Treatment of chronic insomnia in children and adolescents with neurodevelopmental disabilities", The Journal of Child Psychology and Psychiatry. 2017. pp. 1-20.
Blackmer, A. B., et al., "Management of Sleep Disorders in Children With Neurodevelopmental Disorders: A Review", Pharmacotherapy, 2016, vol. 36, No. 1, pp. 84-98.
Owens, J. A., et al., "Use of pharmacotherapy for insomnia in child psychiatry practice: A national survey", Sleep Medicine 2010, vol. 11, pp. 692-700.Additional References sheet(s) attached.
Kallepalli, M.D. B.R., et al., "Trazodone is only slightly faster than fluoxetine in Relieving Insomnia in Adolescents with Depressive Disorders". Journal of Child and Adolescent Psychopharmacology, vol. 7, No. 2, 1997, XP009000451, pp. 97-107.
Pranzatelli, M.R., et al., "Sleep Disturbance and Rage Attacks in Opsocionus-Myoclonus Syndrome: Response to Trazodone", The Journal of Pediatrics, Sep. 2006, XP5086826, pp. 372-378.
Oggianu, L., et al., "Estimation of an Appropriate Dose of Trazodone for Pediatric Insomnia and the Potential for a Trazodone-Atomoxetine Interaction", Citation: CPT Pharmacometrics Syst. Pharmacol., 2020, vol. 9, pp. 77-86.
Indian Patent Application 1242/MUM/2005, filed Oct. 3, 2005, 12 pages.
Thapar, A, et al., "Neurodevelopmental disorders", Lancet Psychiatry, Apr. 2017, vol. 4, No. 4, pp. 339-346.
Angriman, M., et al., "Sleep in Children with Neurodevelopmental disabilities", Neuropediatrics. Jun. 2015, vol. 46, No. 3, pp. 19-210.
Jaffer, K.Y, et al., "Trazodone for Insomnia: A Systematic Review", Innovations in Clinical Neuroscience, Jul.-Aug. 2017; vol. 14, No. 7-8, pp. 24-34.
"Guideline on pharmaceutical development of medicines for paediatric use", EMA/CHMP/QWP/805880/2012 Rev. 2, European Medicines Agency, Committee for Medicinal Products for Human Use, Aug. 1, 2013, 24 pages.
Indian Office Action issued Jan. 1, 2024 in Indian Patent Application No. 202247023491, 6 pages.
Salunke et al., "The STEP (Safety and Toxicity of Excipients for Paediatrics) database: Part 2—the pilot version", International Journal of Pharmaceutics, vol. 457, 2013, pp. 310-322.

* cited by examiner

*Primary Examiner* — Jeffrey S Lundgren
*Assistant Examiner* — Eric Tran
(74) *Attorney, Agent, or Firm* — Oblon, McClelland, Maier & Neustadt, L.L.P.

(57) ABSTRACT

The invention relates to trazodone for use in the treatment of insomnia in the pediatric population, wherein said pediatric population is affected by an Intellectual Disability or a Neurodevelopmental Disorder. The invention also relates to pediatric formulations at a trazodone concentration comprised of from 0.1 to 4% and pediatrically suitable excipients.

7 Claims, No Drawings

PEDIATRIC TRAZODONE COMPOSITIONS AND METHOD OF TREATMENT THEREOF

FIELD OF THE INVENTION

The present invention relates to a method for the treatment of insomnia in a pediatric population and to the development of stable pharmaceutical compositions suitable for administration to the pediatric population.

BACKGROUND ART

Trazodone is an antidepressant which exerts its activity as serotonin antagonist and reuptake inhibitor. It is indicated primarily for the treatment of depression in patients who do not respond to antidepressants, such as selective serotonin reuptake inhibitors. Due to the combined serotoninergic receptor antagonism and serotonin reuptake inhibition, trazodone has demonstrated unique therapeutic flexibility, which has given rise to its potential use in a broad range of co-morbidities of major depressive disorder, as well as off-label indications, including insomnia. The hypnotic effect of trazodone is promptly achieved, with possible beneficial effects on sleep architecture and quality in depressed patients.

Trazodone also shows a sedating activity, with reviews indicating that insomnia is the most common reason for its off-label prescription and use in adult and paediatric populations (Blackmer A. B, and Feinstein J. A., "Management of Sleep Disorders in Children With Neurodevelopmental Disorders: A Review", Pharmacotherapy 2016, 36(1):84-98 2016).

In fact, insomnia represents a common problem in children with neurodevelopmental disorders, affecting the quality of life of both children and families and contributing to worsen behavioral disturbancies.

Owens J. A. et Al in "Use of pharmacotherapy for insomnia in child psychiatry practice: A national survey", Sleep Medicine 2010, 11: 692-700, discloses that trazodone is the most commonly prescribed off-label insomnia medication for children with mood and anxiety disorders (MD and AD) and the second most frequently prescribed medication for children with both Attention Deficit Hyperactive Disorders (ADHD) and Mental Retardation/Developmental Delay (MR/DD).

However, despite favorable anecdotal reports on the use of trazodone in pediatric insomnia, controlled clinical trials to evaluate its efficacy and safety and next, appropriate dosages in children, are still lacking. In fact, although the clinical pharmacokinetics (PK) of trazodone has been extensively studied in adults, details relevant to the metabolism of trazodone remain unclear. In vitro studies have shown that it is metabolized predominantly by CYP3A4 and CYP3A5 to the active metabolite m-chlorophenylpiperazine (mCPP) with CYP2C19 and CYP2D6 contributing as well to trazodone metabolism into other (inactive) metabolites. Studies in children, where metabolic pathways may greatly differ from adults are therefore needed.

Liquid trazodone compositions have been described and are commercially available. For example, WO2009/016069 discloses liquid pharmaceutical compositions, where trazodone HCl has a concentration of 6% w/V or 1% w/V. Furthermore, the Indian patent Application 1242/MUM/2005 discloses liquid pharmaceutical compositions where trazodone is, at least theoretically, in concentration comprised from 0.5-5% w/V.

On the market, 6% w/w trazodone solutions are available, which are stable in a pH range comprised from 5 to 6 and stable up to three years for adult's administration.

It is highly felt in the field the need to develop pediatric pharmaceutical compositions at low trazodone concentration, stable, palatable, comprising excipients allowed for pediatric use and allowing a fine tuning of the dosage in this highly heterogeneous population.

SUMMARY OF THE INVENTION

Detailed Description of the Invention

According to a first embodiment, the invention relates to a method for treating insomnia in the pediatric population, preferably caused by neurodevelopmental disorders, with low dosage trazodone.

This embodiment provides trazodone for use in a pediatric population. According to this embodiment, trazodone is used in doses comprised from 0.2 to 0.6 mg/kg in pediatric patients with insomnia secondary to Intellectual Disability (ID) or Neurodevelopmental Disorders (NDD), in particular NDDs such as Autism Spectrum Disorder (ASD), Attention Deficit Hyperactivity Disorder (ADHD).

Other IDs which may benefit from the treatment of insomnia are: Tic Disorders, Fragile X Syndrome, Cerebral Palsy, Angelman Syndrome, Learning Disabilities, Conduct Disorder, Down Syndrome, Rett Syndrome (Thapar A, Cooper M, Rutter M. Neurodevelopmental disorders. Lancet Psychiatry. 2017 April; 4(4):339-346; Angriman M, Caravale B, Novelli L, Ferri R, Bruni O. Sleep in children with neurodevelopmental disabilities. Neuropediatrics. 2015 June; 46(3):199-210).

In the method of the invention, the pediatric population is aged from 2 to 17 years and comprises two subpopulations: the first one aged from 6 to 17 years (up to the $18^{th}$ birthday) and the second from 2 to 5 years (up to the $6^{th}$ birthday).

Patients who may benefit from this therapeutic treatment and solve insomnia episodes and other symptoms of ID and NDD are pediatric subjects suffering from an Intellectual Disability (ID) or neurodevelopmental disorders (NDD) as above described, in particular neurodevelopmental deficit such as: Autism Spectrum Disorder (ASD), Intellectual disability and Attention Deficit/Hyperactivity Disorder (ADHD).

Doses which have been preliminarily found to increase the sleep time in the pediatric population with NDD are in particular 0.4 and 0.5 mg/kg/day by drops or the equivalent dosage by syrup.

The invention also encompasses all the intermediate dosages, such as: 0.4, 0.41, 0.42, 0.43, 0.44, 0.45, 0.46, 0.47, 0.48 0.49, 0.50, up to 0.6 mg/kg, daily. For example, a pediatric therapeutic scheme may comprise administration of the drop compositions from five to thirty drops of either 1.5% or 3% w/V liquid formulation, depending on the age group, weight of the patient severity of the disease etc., daily, preferably for at least one week or even more preferably chronically.

These dosages and the relevant therapeutic schedule in the pediatric population, for the treatment of insomnia secondary to the above mentioned ID and NDD pathologies, may be adapted to other administration routes at low trazodone dosage compositions.

Trazodone is preferably administered before bedtime in a pediatrically suitable pharmaceutical formulation, such as palatable syrups or drops to be diluted in drinks, creams or semisolid food compositions that children typically like.

Trazodone may be co-administered with other drugs typically used in ID or NDDs. According to this further embodiment trazodone is administered with at least one drug selected in the group consisting of: first generation antipsychotics, such as haloperidol, second generation antipsychotics, such as olanzapine, antidepressants, such as amitriptyline, benzodiazepines, such as lorazepam, antiepileptics, such as gabapentin, mood stabilizers, such as lithium, psychostimulants, such as methylphenidate, antispasmodics, such as biperiden and atomoxetine.

With the aim of providing means for the pediatric use of trazodone, pharmaceutical compositions at low trazodone concentration, which are stable, palatable, which avoids particular excipients or co-solvent, such as ethanol, where only excipients allowed for pediatric use are present, and which allow a fine tuning of the dosage in children depending on the age, the weight, the disease and its severity, have been developed.

As known, this is a critical task, as certain excipients acceptable in adult formulations may not be appropriate for pediatric use, e.g. ethanol in oral liquids or benzyl alcohol in intravenous formulations, in particular for neonates. In fact, pediatric patients may not be able to metabolize or eliminate an ingredient in the same manner as adult and so in some instances this may lead to deleterious side effects (CHMP, 2006). The toxicity of excipients may differ between adult and pediatric patients and across pediatric subsets, e.g. neonates have been demonstrated to metabolize propylene glycol less efficiently than other pediatric populations thereby leading to accumulation and potential adverse events (FDA, 2011). Furthermore, higher risks of adverse effects should be considered in children taking multiple medications, as they may be exposed to several potentially toxic doses of excipients while receiving routine multiple treatments. For instance, benzyl alcohol, propylene glycol and polysorbate 80 co-administration resulted in various toxicological syndromes in pediatric populations especially neonates.

According to this embodiment pediatric liquid solutions either in drops or as syrups have been developed. They comprise pediatrically acceptable excipients and provide a Maximum Daily Intake (MDI) which is well below the Acceptable Daily Intake (ADI), do not comprise ethanol and preferably comprise the following co-solvent combinations: PEG 400 and propylen-glycol for the drops compositions or glycerol, sucrose and PEG 400 for syrups, with a reduced amount of propylen glycol.

Preliminary data show that the pediatric pharmaceutical trazodone compositions with 0.1% to 4% w/V trazodone concentration, are useful for treating insomnia caused by neurodevelopmental disorders, such as Autism Spectrum Disorder (ASD), Intellectual disability and Attention Deficit/Hyperactivity Disorder (ADHD) and are very well accepted by children, because of the sweet taste.

The pediatric population, which benefits from this treatment is aged from 2 to 17 years, up to the $18^{th}$ birthday. Two subpopulations have been identified: the first one aged from 6 to 17 years and the second from 2 to 5 years. The first one can be treated with 3% w/w and the second with 1.5% w/V trazodone solutions.

Alternative administration by syrup compositions is also suitable for administration to children, which enjoy the sweet taste of this pharmaceutical form.

As a matter of fact, is highly felt in the field of pediatric drugs and pediatric therapeutic treatments, in particular insomnia, the need to develop stable compositions which comprise the majority of pediatrically approved excipients, which allow easily a low dosage for younger children and where the bitter taste of trazodone is conveniently masked. These compositions are preferably drops, as described above, or syrups.

Drops, which are typically diluted in a liquid, need to overcame the technical problem of being stable in liquids (or semisolid food compositions) and beverages that children typically like, such as fruit juices, yoghurts, creams, or soft drinks, i.e. in food compositions comprising an extremely wide variety of additives, such as emulsifiers, preservative agents and the like.

These are the problems met during the development of pediatric composition, in addition to the known disadvantages of liquid trazodone solutions, the physical aspect of which may turn yellow due to oxidation phenomena and which have an extremely bitter taste, up to now strongly limiting the possibilty of their use in children.

Furthermore trazodone, which has a pKa of 6.61 is fully soluble only at acidic pH and precipitates at pH values close to neutrality.

Therefore, according to an embodiment the invention relates to pediatric drop compositions comprising a trazodone salt, in concentration comprised from 0.1% w/V and 4% w/V. Preferably trazodone is trazodone HCl, and has a concentration of 1% w/V or higher, more preferably comprised from 1 to 3% w/V. Drop compositions for pediatric use do not comprise alcohol as solvent or co-solvent, are stable in the more concentrated form, do not turn yellow with time and are stable also when diluted in a suitable liquid for administration to children, e.g. a fruit juice or sugar water, a yoghurt or a cream.

In the trazodone compositions developed by the Applicant, the excipients are approved for pediatric use and without known contraindications in the pediatric population. Excipients are present in a Maximum Daily Intake (MDI) which is well below the Acceptable Daily Intake (ADI), according to the competent Authorities, when administered to provide a suitable trazodone dose. The ADI and MDI for most of the excipients used in the pharmaceutical compositions of the invention are shown in Table 1.

TABLE 1

Acceptable Daily Intake (ADI) for some excipients

| Excipients | CAS | ADI mg/kg/day | References | Link and Note |
|---|---|---|---|---|
| Propylene glycol | 57-55-6 | 25 | [JECFA, 1974; JECFA 2001] | — |
|  |  | 50 | [EMA, 2014] | — |
| Polyethylene glycol 400 | 25322-68-3 | 10 | [JECFA, 1979; 1980] | — |

TABLE 1-continued

Acceptable Daily Intake (ADI) for some excipients

| Excipients | CAS | ADI mg/kg/day | References | Link and Note |
|---|---|---|---|---|
| Citric acid anhydrous | 77-92-9 (anhydrous) | Not limited | [JECFA, 1973; 2014] | — |
| Sucralose | | 15 (UE) | [SCF, 2000] | SCF opinion https://ec.europa.eu/food/sites/food/files/safety/docs/sci-com_scf_out68_en.pdf |
| | 56038-13-2 | 15; 5 (USA) | (JECFA 1991); [FDA, 1998] | — |
| Sodium hydroxide | 1310-73-2 | Not limited | (JECFA, 1966); (EC, 1991) | Scientific Committee on Consumer safety (SCCS) Opinion |
| Propyl gallate | 121-79-9 | 1.4; 0.5 | (JECFA, 1996); [EFSA, 2014] | use 0.5 mg/kg/day (EFSA 2014) |
| Disodium edetate | | 1.9 (expressed as EDTA) | [JECFA, 2007]; JECFA (1973) | — |
| | 139-33-3 | 2.5 | | |
| methyl parahydroxybenzoate | 99-76-3 | 10 | (JECFA, 1973) | — |
| Polyethylene glycol 6000 | 25322-68-3 | 10 | (JECFA, 1980) | EFSA opinion 2018 |
| K-Sorbate | 24634-61-5 | 3; 11 | EFSA, 2012 | EFSA opinion 2012 |
| Glycerol | 56-81-5 | not specified | (JECFA, 1976) | EFSA opinion 2017 |
| Sorbitol | 50-70-4 | not specified | (JECFA, 1982) | — |
| Sucrose | 57-50-1 | GRAS | | Scientific Opinion on the substantiation of health claims related to the sugar replacers xylitol, sorbitol, mannitol, maltitol, lactitol, isomalt, erythritol, D-tagatose, isomaltulose, sucralose and polydextrose and maintenance of tooth mineralisation by decreasing tooth demineralisation (ID 463, 464, 563, 618, 647, 1182, 1591, 2907, 2921, 4300), and reduction of post-prandial glycaemic responses (ID 617, 619, 669, 1590, 1762, 2903, 2908, 2920) pursuant to Article 13(1) of Regulation (EC) No 1924/2006. EFSA Journal 2011; 9(4): 2076. |
| Sodium Citrate | 994-36-5 | not specified | (JECFA, 1974) | |
| Sodium Benzoate | 532-32-1 | 5 | (JECFA, 1996) | EFSA opinion 2016 |

GRAS: Generally Recognized as Safe

Of note, trazodone solutions in drops, suitable for pediatric administration are compatible with liquid beverages that children typically like such as fruit juice, sugar water, yoghurt and cream.

TABLE 2

Preferred drop formulations:

| Ingredients | Trazodone HCl 30 mg/ml Concentration (g %) | Trazodone HCl 15 mg/ml Concentration (g %) | Function | Monograph |
|---|---|---|---|---|
| Trazodone Hydrochloride | 3.00 | 1.50 | Active ingredient | DMF |
| Preferably Propylene Glycol | 30.00 | 30.00 | Co-solvent | Ph. Eur. |
| Preferably PEG 400 | 25.00 | 25.00 | Co-solvent | Ph. Eur. |
| Propyl gallate | 0.10 | 0.10 | Antioxidant | Ph. Eur. |
| Preferably Sucralose | 0.15 | 0.15 | Sweetener | Ph. Eur. |
| Preferably Disodium Edetate (EDTA) | 0.05 | 0.05 | Chelating agent | Ph. Eur. |
| Preferably Citric Acid Anhydrous | 0.50 | 0.50 | Buffering agent | Ph. Eur. |
| Base (preferably Sodium Hydroxide) | 0.13 | 0.13 | Buffering agent | Ph. Eur. |
| Demineralized water | Up to 100 ml | Up to 100 ml | Solvent | |

As alternative co-solvents the composition may comprise: glycerol-PEG 200, PEG 6000, other PEGs.

As alternative antioxidant: Ascorbic Acid-Vitamin E-Ascorbil palmitate

As alternative sweetener: Sucrose-Aspartame-Saccharine-Neotame-Stevia-Sodium Cyclamate-Acesulfame K.

As alternative chelating agent: Citric Acid-Tartaric Acid

As alternative buffering agent: Sodium citrate-K-phosphate

Therefore, according to a preferred aspect, drop formulations comprise:
the active ingredient,
a glycol, preferably propilen glycol in a % comprised from 5 and 45% (w/V), preferably 20-40%, optionally in combination with a sugar, such as sucrose or sucralose. A simple polyol such as glycerol can also be used as co-solvent, together with an alditol, such as for example sucrose.

Drop formulations have a pH value comprised from 4.5 to 5.5, more preferably comprised form 4.5 to 5.2, more preferably comprised from 4.5 to 5, and comprise at least two co-solvents in total quantity of 50-60% w/V, preferably selected in the group consisting of the following mixtures: propylene glycol+PEG 200, propylene glycol+PEG 400, propylene glycol+PEG 6000, propylene glycol+PEG 200+PEG 6000, propylene glycol+PEG 400+PEG 6000, PEG 200+PEG 6000, and PEG 400+PEG 6000. Preferred combination is propylene glycol+PEG 400. An oligosaccharide, preferably sucralose, may be present as sweetener.

Notably, the drop compositions according to the invention do not comprise preservative agents.

As a further embodiment, the Applicant has developed trazodone syrup formulations with a trazodone concentration lower than in the drop formulation, for the direct administration in the pediatric population. In syrup compositions, trazodone or a salt thereof has a concentration comprised from 0.1% to 0.9% w/V, preferably comprised from 0.2% to 0.4% w/V, more preferably comprised from 0.24-0.3% w/V, even more preferably 0.26% w/V Alternatively, syrup compositions have a trazodone concentration of 0.1 to 0.9 mg % (w/V), preferably 0.18% to 0.3%. These low concentration solutions have been shown to be comparably stable from a chemical and physical point of view (under a stress test for one week at 70° C. and at 4° C.) as the drop formulations disclosed above and summarized hereinbelow.

Also syrup compositions preferably comprise excipients selected among those suitable for pediatric use. As mentioned above for drops compositions, a number of references provide guidance for the pediatric use and defines the Admissible Daily Intake (ADI) for excipients in the pediatric population, as summarized in Table 1 above. In order to avoid any possible interference among excipients, composition are kept as simple as possible.

Syrups are aqueous compositions where the trazodone salt is in concentration w/V comprised from 0.1-0.9% w/V and with a pH value comprised from 4 to 5.5. Sucrose is present in a concentration of from 25-38%. Preferably, it is present in a concentration of from 30-36%. Advantageously, these compositions are stable and palatable and do not require the addition of any flavour, which may be however optionally present without altering the stability of the composition, as better detailed in the experimental part.

The co-solvent or co-solvent mixture has a concentration w/V comprised from 10-60%, preferably comprised from 10-40% w/V. The preferred combination is glycerol 20-30% w/V, propylen-glycol below 9% w/V, preferably comprised from 5 to 8% w/V, and PEG-400 of from 1-5% preferably of from 2-3% w/V.

In fact syrup compositions, administered undiluted, have been developed to comprise a reduced concentration of propylen-glycol, which is advantageously below 9% w/V. In these compositions, sucrose can be used in a % w/V higher than 30% and provides the required palatability and trazodone stability.

Syrup compositions do preferably comprise an antioxidant, a buffering agent and a preserving agent which is preferably selected in the group comprising methyl and propyl parahydroxybenzoate, potassium sorbate and mixture thereof. Preferred is potassium sorbate or, alternatively, sodium benzoate. The antioxidant is selected in the group comprising: propyl gallate and EDTA and mixtures thereof. Preferably, the buffering agent is citrate.

Preferably these solutions comprise trazodone HCl as trazodone salt.

Syrup compositions described above are extremely palatable and can be used in the pediatric population by os or by the transmucosal route.

According to the above preferred embodiments, the invention also relates to the pharmaceutical compositions either in drops or in syrup, for use in the treatment of insomnia and its symptoms, such as anxiety, agitation or confusion state, motor agitation in pediatric children with Intellectual Disabilities or Neurodevelopmental Disorders, as above defined, wherein children are aged from 2 to 17 years old (up to the 18$^{th}$ birthday), said therapeutic treatment comprising the oral or transmucosal administration of the preferred composition, suitable to provide a dosage of from 0.2 to 0.6 mg/kg, before sleeping, in the preferred forms, i.e. drops diluted in a liquid that children like the most, or syrups which are administered without dilution.

Exemplary syrup composition are disclosed in the following Table 3.

TABLE 3

Exemplary syrup compositions

| Excipients | Trials | | | |
| --- | --- | --- | --- | --- |
|  | C % w/V | E % w/V | F % w/V | G % w/V |
| Trazodone HCl | 0.26 | 0.13 | 0.2 | 0.2 |
| Propylen Glycol |  | 6.0 | 6.0 | 6.0 |
| Glycerol | 20 | 10.000 | 25 | 25 |
| PEG 400 |  | 2.4 | 2.4 | 2.4 |
| Sorbitol | 10 |  |  |  |
| Sucrose |  | 35.000 | 35 | 35 |
| Sucralose |  |  | 0.05 | 0.05 |
| Citric Acid | 0.056 | 0.430 | 0.47 | 0.51 |
| Sodium Citrate | 0.083 | 0.519 | 0.46 | 0.41 |
| EDTA | 0.05 | 0.05 | 0.05 | 0.05 |
| Propylgallate | 0.1 | 0.05 | 0.03 | 0.03 |
| Sodium Benzoate |  |  |  | 0.5 |
| Methyl paraben | 0.13 | 0.130 | 0.130 |  |
| K-Sorbate | 0.12 | 0.120 | 0.120 |  |
| Water | up to 100 | up to 100 | up to 100 | up to 100 |
| Solubility of API | comply | not comply, precipitation was observed | comply | comply |
| Physical stability at 4° C. | not comply, precipitation was observed | comply | comply | comply |
| Challenge test | NP | NP | comply | comply |
| Final Evaluation | — | — | Suitable | Suitable |

In summary, syrup compositions preferably comprise the following excipients:
PEG w/V 0-5%, preferably PEG 400 2-4% w/V
Glycerol 20-30% w/V, preferably 23-28% w/V,
Propylen glycol 5-10% w/V, preferably 6-8% w/V
Sucrose 30-40% w/V, preferably 33-38% w/V Of note, syrup composition comprise a very low concentration of PEG, preferably PEG-400, propylen-glycol and preserving agents (namely sodium benzoate, methyl paraben or potassium sorbate), with a MDI well below the ADI.

Patients who may benefit from the use of these compositions in a treatment for ameliorating insomnia, are pediatric subjects suffering from intellectual Disability and neurodevelopmental deficit, such as: Autism Spectrum Disorder (ASD), Intellectual disability and Attention Deficit/Hyperactivity Disorder (ADHD). In particular three different dosages may be used: 0.25/0.4 and 0.5 mg/kg by drops or the equivalent dosage by syrup. For example, a pediatric therapeutic scheme may comprise administration of the drop compositions from five to thirty drops of either 1.5% or 3% w/V liquid formulation, depending on the age group, weight of the patient and severity of the disease.

These dosages and the relevant therapeutic schedule in the pediatric population for insomnia, secondary to the above mentioned Intellectual disabilities and Neurodevelopmental disorders, may be adapted to other administration routes and low trazodone dosage compositions and can be administered chronically or for at least 1 week.

The pharmaceutical syrup composition of the present invention can be prepared in suitable mono pre-diluted and pre-packed dosage form.

However, other low dosage forms can be prepared by the skilled artisan, providing a dosage of 0.2 to 0.6 mg/kg daily per pediatric patient. For example, low dosage tablets, capsules, lozenges, sugar drops, lollypops, coated tablets, granules or the solutions and syrups described above can be provided for oral administration; medicated patches can be provided for transdermal administration; suppositories for rectal administration and injectable sterile solutions.

Other suitable dosage forms are those with modified release and those based on liposomes for oral, injectable or transdermal, or transmucosal administration. A particularly preferred alternative administration route and composition is the transmucosal route and transdermal patches.

The dosage forms can also contain other traditional ingredients such as: preservatives, stabilizers, surfactants, buffers, salts for regulating osmotic pressure, emulsifiers, sweeteners, colorants, flavourings and the like, suitable for pediatric use.

The amount and the number of administrations may vary over a range depending on factors, such as the type of pathology or symptom, the severity of the disease, the patient's body weight and age, metabolism rate, the dosage form of the suitable pharmaceutical form and administration route. A dosage comprised from 0.2 to 0.6 mg/kg, preferably 0.3, 0.35. 0.4, 0.45, 0.5, 0.55 mg/kg trazodone is useful for pediatric use, daily, and is preferably administered before bedtime. Particularly preferred are the higher dosages comprised from 0.4-0-6 mg/kg.

The physician skilled in the art can determine the optimum conditions adapting the invention to the specific conditions of the pediatric patient with neurodevelopmental disorder.

EXPERIMENTAL PART

Example 1. Preparation of Trazodone Composition (Drops)

Two formulations were developed as oral drop solutions, containing two different concentrations of Trazodone Hydrochloride as active ingredient:
Trazodone HCl 15 mg/ml (1.5% w/V)
Trazodone HCl 30 mg/ml (3% w/V)

Respectively useful for the treatment of pediatric population, aged between 2-6 and 6-17 years.

The formulations have been developed in accordance with the requirements of the EMA Guideline on pharmaceutical development of medicines for pediatric use.

Drops are particularly adequate for a flexibility of dosage and could be mixed with juice or sugar water to improve the patient compliance.

Table 4 below reports the two drops formulations

TABLE 4

Drop compositions for pediatric use (no preservatives)

| Ingredients | Trazodone HCl 30 mg/ml Concentration (g %) | Trazodone HCl 15 mg/ml Concentration (g %) | Function | Monograph |
|---|---|---|---|---|
| Trazodone Hydrocloride | 3.00 | 1.50 | Active ingredient | DMF |
| Propilen Glycol | 30.00 | 30.00 | Co-solvent | Ph. Eur. |
| PEG 400 | 25.00 | 25.00 | Co-solvent | Ph. Eur. |
| Propilgallate | 0.10 | 0.10 | Antioxidant | Ph. Eur. |
| Sucralose | 0.15 | 0.15 | Sweetener | Ph. Eur. |
| Disodium Edetate (EDTA) | 0.05 | 0.05 | Chelating agent | Ph. Eur. |
| Citric Acid Anhydrous | 0.50 | 0.50 | Buffering agent | Ph. Eur. |
| Sodium Hydroxide | 0.13 | 0.13 | Buffering agent | Ph. Eur. |
| Demineralized water | Up to 100 ml | Up to 100 ml | Solvent | |

According to this embodiment preferred drop compositions with a trazodone concentration of from 1-3% w/V further comprise the following excipients: propylene glycol 20-40% w/V, preferably 25-35% w/V, PEG, preferably PEG 400 20-30% w/V, propyl gallate as an antioxidant and citric acid as a buffering agent. Notably, these compositions do not contain any preservative agent.

Toxicological Evaluation

The Toxicological Risk Assessment of the formulations was performed to evaluate the safety of the excipients employed in the two oral drops formulations for pediatric use. The evaluation was carried out according to the EMA Guideline on pharmaceutical development of medicines for pediatric use (EMA/CHMP/QWP/805880/2012 Rev. 2).

The evaluation was performed taking into account the two following target population:
  children from 2 years of age for Trazodone HCl 1.5% oral solution
  children from 6 years of age for Trazodone HCl 3.0% oral solution and in function of the proposed Maximum Daily Therapeutic Dose up to 0.5 mg/kg/day, and considering a chronic use of the product, once a day, before to sleep.

The outcome of the evaluation was that all the selected excipients were considered as safe and devoid of any potential toxicological risk under the intended conditions of use in pediatric population. Indeed, the selected excipients are safely used in pharmaceutical formulas as well as in food and in compliance with the relevant Ph. Eur. Monograph.

Finally, no specific alerts for pediatric population have been identified for the selected excipients. In fact, for each excipient the MDIs (Maximum Daily Intake), is below the recommended ADI (Admissible Daily Intake), or the regulatory limit, when available, as reported in the following Table 5.

TABLE 5

MDI and ADI for selected excipients

| Excipients | % w/V (g/100 ml) | MDI (for 2 years aged children) mg/kg/day | MDI (for 6 years aged children) mg/kg/day | ADI mg/kg/day | References |
|---|---|---|---|---|---|
| Propylene glycol | 30.00 | 10.00 | 5.00 | 25 50 | [JECFA, 1974; JECFA 2002] [EMA 2014] |
| Polyethylene glycol 400 | 25.00 | 8.33 | 4.17 | 10 | [JECFA, 1979] |
| Citric acid anhydrous | 0.50 | 0.17 | 0.08 | Not limited | [JECFA, 1974] |
| Sucralose | 0.15 | 0.05 | 0.03 | 15 (UE) 5 (USA) | [SCF, 2000] [FDA, 1998] |
| Sodium hydroxide | 0.13 | 0.04 | 0.02 | Not limited | |
| Propyl gallate | 0.10 | 0.03 | 0.02 | 0.5 | [EFSA, 2014] |
| Disodium edetate | 0.05 | 0.02 | 0.01 | 1.9 (expressed as EDTA free acid) | [JECFA, 2007] |
| Purified water q.b. | 100 ml | | | | |

The following Table 6 shows the specifications of the two trazodone drop formulations

TABLE 6

Trazodone drop formulations

| Tests | Methods | Monograph/Guidance | Trazodone HCl 30 mg/ml Specifications | Trazodone HCl 15 mg/ml Specifications |
|---|---|---|---|---|
| Appearance | Visual inspection | Internal spec | Colourless to slightly yellow, clear solution | Colourless to slightly yellow, clear solution |
| pH | ph meter | Internal spec | 4.8-5.2 | 4.8-5.2 |
| Density | Densimeter | Internal spec | 1.069 ± 0.01 gr/ml | 1.062 ± 0.01 gr/ml |
| Trazodone Hydrochloride identification | Internal HPLC Method(*) | According to EMA Guideline Specifications and Control Tests on the Finished Product | Complies | Complies |
| Trazodone Hydrochloride assay | Internal HPLC Method(*) | | 95.0%-105.0% | 95.0%-105.0% |
| Propyl gallate identification | Internal HPLC Method(*) | According to EMA Guideline Specifications and Control Tests on the Finished Product | Complies | Complies |
| Propyl gallate assay | Internal HPLC Method(*) | | 90.0%-110.0% | 90.0%-110.0% |
| AF 1814 | Internal HPLC Method(*) | According to ICH Q3B Note for guidance on impurities in new drug products | ≤0.3% | ≤0.3% |
| AF 2066 | Internal HPLC Method(*) | | ≤0.2% | ≤0.2% |
| Each unknown related to Trazodone | Internal HPLC Method(*) | | ≤0.2% | ≤0.2% |
| Total degradation products | Internal HPLC Method(*) | Internal spec | ≤1.0% | ≤1.0% |
| Microbiological Controls | According to Ph. Eur. 5.1.4 | According to Ph. Eur. 5.1.4 | TAMC ≤ 100 ufc/ml TYMC ≤ 10 ufc/ml E. Coli = absent | TAMC ≤ 100 ufc/ml TYMC ≤ 10 ufc/ml E. Coli = absent |
| Preservative efficacy test | According to Ph. Eur. 5.1.3 | According to Ph. Eur. 5.1.3 | Complies | Complies |
| Dose and Uniformity of dose of oral drops | According to Ph. Eur. 2.9.6 | According to Ph. Eur. 2.9.6 | Complies | Complies |

(*)Stability indicating method and fully validated in accordance to ICH Q2(R1)

Of note, both solutions are preservative free formulations and considered toxicologically safe for children in the target age of interest (2-5—up to the 6$^{th}$ birthday—years old and 5-17, up to the 18$^{th}$ birthday).

The selected dropper device, the same for both, can be considered a good system for the scope due to the high dosage flexibility. All the dosages are covered by the administration from five to thirty drops. The accuracy and precision where also studied and demonstrated as well.

Both developed products are stable if stored at ICH stability conditions until 2 years. An in-use stability was performed showing good results. In order to improve further the taste of products, and consequently the acceptability by patients, also the stability of drops diluted in a number of beverages and liquids, such as sugar water or orange juice, before administration, was demonstrated.

Example 2. Preparation of Trazodone Compositions (Syrup)

A number of syrup formulations were developed with the same concentration of Trazodone Hydrochloride (0.26% w/V) and are reported in the following table 7 numbered as 4, 5 and 6.

TABLE 7

Exemplary syrup formulations

| Ingredients | #4 Concentration (w/V %) | #5 Concentration (w/V %) | #6 Concentration (w/V %) | Function |
|---|---|---|---|---|
| Trazodone | 0.26 | 0.26 | 0.26 | Active ingredient |

TABLE 7-continued

Exemplary syrup formulations

| Ingredients | #4 Concentration (w/V %) | #5 Concentration (w/V %) | #6 Concentration (w/V %) | Function |
|---|---|---|---|---|
| Propylene Glycol | 13 | 13 | — | Co-solvent |
| PEG 400 | — | 5.2 | — | Co-solvent |
| Liquid Sorbitol | — | — | 10 | sweetener |
| Glycerol | — | 10 | 20 | Co-solvent |
| Sucrose | 50 | 35 | — | sweetener |
| Propyl gallate | 0.03 | 0.03 | 0.1 | Antioxidant |
| Disodium Edetate (EDTA) | 0.006 | 0.006 | 0.05 | Chelating agent |
| Citric Acid | 0.282 | 0.430 | 0.056 | Buffering agent |
| Sodium Citrate | 0.519 | 0.519 | 0.083 | Buffering agent |
| Methyl paraben | 0.130 | 0.130 | — | Preservative |
| Potassium Sorbate | 0.120 | 0.120 | — | Preservative |
| Demineralized water | Up to 100 ml | Up to 100 ml | Up to 100 ml | Solvent |

Other syrup formulations were developed and tested, as described in the following table:

TABLE 8

Alternative exemplary syrup composition

| Excipients | Trials C % w/V | E % w/V | F % w/V | G % w/V |
|---|---|---|---|---|
| Trazodone HCl | 0.26 | 0.13 | 0.2 | 0.2 |
| Propylen Glycol | | 6.0 | 6.0 | 6.0 |
| Glycerol | 20 | 10.000 | 25 | 25 |
| PEG 400 | | 2.4 | 2.4 | 2.4 |
| Sorbitol | 10 | | | |
| Sucrose | | 35.000 | 35 | 35 |
| Sucralose | | | 0.05 | 0.05 |
| Citric Acid | 0.056 | 0.430 | 0.47 | 0.51 |
| Sodium Citrate | 0.083 | 0.519 | 0.46 | 0.41 |
| EDTA | 0.05 | 0.05 | 0.05 | 0.05 |
| Propylgallate | 0.1 | 0.05 | 0.03 | 0.03 |
| Sodium Benzoate | | | | 0.5 |
| Methyl paraben | 0.13 | 0.130 | 0.130 | |
| K-Sorbate | 0.12 | 0.120 | 0.120 | |
| Water | up to 100 | up to 100 | up to 100 | up to 100 |
| Solubility of API | comply | not comply, precipitation was observed | comply | comply |
| Physical stability at 4° C. | not comply, precipitation was observed | comply | comply | comply |
| Challenge test | NP | NP | comply | comply |
| Final Evaluation | Unsuitable | Unsuitable | Suitable | Suitable |

Of note, the pH of all formulations was about 4.5.

Formulations F an G have been evaluated as palatable, even without the addition of flavourings. However, as a test, berry flavour was also added up to a 0.15% w/V to formulations F and G, ameliorating palatability. Stability of these flavoured formulations in the same test conditions was confirmed.

As reported in the table above, two different formulations ("F" and "G"), both containing 0.2% of API, were considered the best products matching all the initial requirements of the product in terms of solubility and stability.

The solubility issue of the API was overcome selecting the right co-solvents and their final concentration taking into consideration also the ADI (Acceptable Daily Dose) of each excipient for the target population.

The amount of sucrose was reduced with the aim to overcome instability issues highlighted by the browning effect of the final formulation if stored at high temperature.

The sweetness of the product has been improved by using a very low concentration of sucralose, a safer excipient and free from interactions with the active ingredient.

Two different preservatives systems were also selected: the first by using only sodium benzoate and the second one by using the combination between Methylparaben and K-Sorbate, the latter more suitable for the pediatric population.

Example 3. Design of Pediatric Dosage

The approach used to estimate the appropriate starting dose(s) of trazodone to support the conduct of clinical trials in children was the Physiologically-Based PharmacoKinetic (PBPK) modelling.

The Simcyp Population-Based Simulator (Version 14 release 1) was used for all the simulations (Simcyp Ltd, Sheffield, United Kingdom). The Simcyp Caucasian Healthy Volunteer population model was used for the adult simulations, while the Simcyp Paediatric population model was used for the simulations in children aged 2-6 years, >6-12 years and >12-17 years. A PBPK model for trazodone was developed based on available physicochemical parameters, data from in vitro experiments, clinical PK parameters and predicted parameters. Derivation of key parameters is described below. The final parameters used in the model are shown in Table 9.

TABLE 9

Input parameter values to simulate the kinetics of trazodone

| Parameter Name | Value | Method/Source |
|---|---|---|
| Physical Chemistry and Blood Binding | | |
| MW (g/mol) | 408.32 | 19 |
| Log P | 2.87 | Calculated from experimental value of logD7.4 (=2.79) |
| Compound type | Monoprotic Base | |
| $pK_a$ | 6.61 | Measured |
| B/P | 0.68 | Calculated from measured E:P ratio of 0.2. |
| $fu_p$ | 0.0354 | Measured by equilibrium dialysis. |
| Model | Full-PBPK | |
| Vss (L/kg) | 1.0 | Predicted (Method 2) |
| Absorption | | |
| $F_a$ | 0.98 | Predicted from mean $P_{app}$ ($24.2*10^{-6}$ cm/s) obtained in Caco-2 cells and calibrated using metoprolol data ($28.1*10^{-6}$ cm/s). |
| $k_a$ (hr$^{-1}$) | IR/oral solution: 1.60 ER: 0.07 | IR: Predicted from mean $P_{app}$ ($24.2*10^{-6}$ cm/s) obtained in Caco-2 cells and calibrated using metoprolol data ($28.1*10^{-6}$ cm/s) ER: fitting of concentration-time data following a single oral dose of 300 mg ER trazodone |
| $fU_{gut}$ | 1.0 | Default value |
| Elimination | | |
| $CL_{int, CYP3A4}$ (µL/min/pmol) | 0.438 | Retrograde calculation-assign 70% of hepatic metabolism to CYP3A4 (see Methods section) |
| Additional HLM $CL_{int}$ (µL/min/mg) | 25.7 | Retrograde calculation-assign 30% of hepatic metabolism to undefined pathways (see Methods section) |

B/P, blood to plasma; $CL_{int}$, intrinsic clearance; CYP, cytochrome P450; E:P, erythrocyte to plasma ratio; ER, extended release; $F_a$, fraction absorbed; $fu_{gut}$, fraction unbound in the gut; $fu_p$, fraction unbound in plasma; HLM, human liver microsome; IR, immediate release; $k_a$, absorption rate constant; MW, molecular weight; $P_{app}$, apparent permeability; PBPK, physiologically-based pharmacokinetic; Vss, volume of distribution.

Trazodone is extensively metabolized by liver cytochromes and the available evidences suggest that CYP3A4 is predominantly involved in its metabolic pathway. Consequently, the estimation of CYP3A4-mediated metabolism was determined ($fm_{CYP3A4}$=70%) and included in the model to account for trazodone elimination.

Trazodone absorption parameters were estimated as well and, based on the bioequivalence observed between the oral solution and the immediate release (IR) tablet formulations, the IR tablet's first-order absorption model was also used to describe the absorption kinetics of trazodone oral solution model.

The developed model in adults was then verified by comparing the simulated plasma concentrations with the observed clinical data for:
  a single oral dose of 50 mg IR tablet or 30, 60 or 90 mg oral solution,
  multiple oral doses of 100 mg IR tablet three times daily for 7 days.

Notably, all the aforementioned simulations matched the corresponding clinical studies.

Trazodone model was refined for pediatric dose estimations by matching, for each age band (i.e., 2-6 years, >6-12 years, and >12-17 years) the equivalent steady state exposures (in terms of maximum plasma concentration, $C_{(max)}$) in adults, following 30, 75 and 150 mg IR (Immediate Release) trazodone per day. Such doses were selected as 30 mg and 75 mg respectively represented the lowest and intermediate doses of the 30-90 mg/day range of doses tested for the treatment of sleeping disorders in adults, while 150 mg represented the initial dose of the approved dose range for the treatment of adult major depressive disorders.

Furthermore, the prediction took into consideration the gastrointestinal physiological changes in the pediatric population (ADAM module) which was comparable to the simulation with a first-order absorption model.

The DDI with drugs frequently used in children with neurodevelopmental disorders (i.e. atomoxetine) was also evaluated and found to be negligible.

In summary, the PBPK model was found to be reliable and predictive for the PK parameters, such as area under the plasma concentration-time curve (AUC) and $C_{max}$, when compared with available clinical data in healthy adults for both IR formulations at all the tested doses (i.e., 50 mg tablet and 30, 60, or 90 mg oral solution). This was shown particularly by the calculated ratios of predicted:observed PK parameters, which were always within 1.5-fold, thus indicating acceptable recovery of the clinical data by the trazodone PBPK model.

In addition, predicted concentration-time profiles were compared with those observed in clinical studies (visual inspection), showing an acceptable correspondence. The final prediction for the pediatric population was then obtained corresponding to adult exposures following the relevant doses of 30, 75 and 150 mg (mg/kg q·d), as disclosed in Table 10 (Oggianu).

The pediatric dose projection primarily focused on matching the equivalent steady-state $C_{max}$ in adults to minimize the potential risk of QT/QTc changes. However, corresponding AUCs were also evaluated and shown to be within the corresponding adult ranges.

Table 4 shows that doses in the following age groups for exposures corresponding to adult dosages of 30, 75 and 150 mg, once a day, were predicted to be as follows:
- 2-6 yr old group, doses of 0.35, 0.8 and 1.6 mg/kg QD, respectively;
- >6-12 yr old group, doses of 0.4, 1.0 and 1.9 mg/kg QD, respectively;
- >12-17 yr old group, doses of 0.4, 1.1 and 2.1 mg/kg QD, respectively.

QD: once a day

TABLE 10

Final predicted pediatric doses corresponding to adult exposure following relevant doses.

| Age Range (yr) | Median BW in the virtual population (kg) | Dose (mg/kg QD) | $AUC_{0\text{-}24\,h,\,Day\,7}$ (ng/mL*h) Geometric Mean (95% CI) | $C_{max,\,Day\,7}$ (ng/mL) Geometric Mean (95% CI) |
|---|---|---|---|---|
| Final predicted pediatric doses (QD) and PK parameters based on matching the adult trazodone $C_{max}$ following 30 mg IR QD for 7 days | | | | |
| 2-6 | 16 | 0.35 | 1876.2 (1736.8-2026.8) | 408 (395.2-421.2) |
| >6-12 | 28 | 0.4 | 2060 (1897.5-2236.4) | 400.5 (386.9-414.6) |
| >12-17 | 51 | 0.4 | 2178.7 (2012.5-2358.6) | 376.7 (362.8-391.1) |
| Adult | 73 | 30 mg | 2619.2 (2402.7-2855.3) | 416.9 (398.8-435.7) |
| Final predicted paediatric doses (QD) and PK parameters based on matching the adult trazodone $C_{max}$ following 75 mg IR QD for 7 days | | | | |
| 2-6 | 16 | 0.8 | 4304.6 (3963.3-4675.3) | 945.9 (916.5-976.5) |
| >6-12 | 28 | 1.0 | 4954.9 (4558.4-5385.8) | 991.6 (959.3-1025.0) |
| >12-17 | 51 | 1.1 | 5718.3 (5238.2-6242.5) | 1037.5 (998.4-1078.2) |
| Adult | 73 | 75 mg | 6369.5 (5800.3-6994.7) | 1025.2 (978.9-1073.6) |
| Final predicted pediatric doses (QD) and PK parameters based on matching the adult trazodone $C_{max}$ following 150 mg IR QD for 7 days | | | | |
| 2-6 | 16 | 1.6 | 8609.3 (7926.7-9350.6) | 1891.9 (1833.0-1952.7) |
| >6-12 | 28 | 1.9 | 9414.3 (8661.0-10233.1) | 1884.1 (1822.6-1947.6) |
| >12-17 | 51 | 2.1 | 10916.8 (10000.2-11917.5) | 1980.7 (1906.0-2058.4) |
| Adult | 73 | 150 mg | 12739.1 (11600.6-13989.3) | 2050.4 (1957.9-2147.3) |

QD: once a day

In the absence of clinical data on PK and efficacy of trazodone in children, the PBPK model was useful for initial dose prediction that enabled ethical and regulatory approval for the clinical trial.

As a matter of fact, traditional allometric methods of dose prediction in children are frequently inaccurate because they are based on body weight (BW) changes without considering the impact of early childhood maturation in body composition, organ maturation, and ontogeny of eliminating enzymes, which are generally nonlinear with age.

Example 4. Clinical Evaluation of the Treatment with Trazodone Low Dosage in the Pediatric Population Three different doses, 0.25/0.4 and 0.5 mg/kg/day were administered at bedtime in fruit juice (in a volume of about 200 mL) in the pediatric population of from 2 to 17 years old.

A multi-centre, randomised, parallel-group, single-blind phase II trial was designed, based on the prediction described in the previous Example 3, to evaluate the pharmacokinetics and PKPD relationship of trazodone after single and repeated oral doses in children from 2 to years of age, suffering from insomnia, affected by neurodevelopmental disorders (NDDs: autism spectrum disorder, intellectual disability or attention deficit hyperactivity disorder). The single-blind phase II trial is still ongoing.

The primary objective of this study is to assess the pharmacokinetics (PK) of trazodone after single and repeated doses in patients aged from 2 to years.

Among the secondary objectives of this study, there are the establishment of the pharmacokinetic-pharmacodynamic (PKPD) relationship of trazodone, as assessed by actigraphy measures, and the definition of the dose rationale in children and adolescents aged from 2 to 7 years taking into account the therapeutic exposure range in adults.

The parent's diary will also be used in the evaluation of the results. This phase II clinical trial is designed to assess the PK and PD of 3 dose levels of trazodone in children with insomnia affected by NDDs. A minimum of 36 patients will be randomly assigned (at least 30 evaluable patients, 10 for each treatment arm; at least 10 evaluable patients aged 2 to years, 10 evaluable patients aged 6 to 1 years, 10 evaluable patients aged 12 to years; at least 3 patients for each age and treatment arm).

Patients are initially assigned to one of the 3 treatment arms. Patients in treatment arms 2 and 3 will receive 0.25 mg/kg/day for 3 days followed by a higher maintenance dose for 7 days:

Treatment arm 1: 0.25 mg/kg/day (on days 1 through 10)
Treatment arm 2: 0.4 mg/kg/day (0.25 mg/kg/day on days 1 through 3 and 0.4 mg/kg/day on days 4 through 10)
Treatment arm 3: 0.5 mg/kg/day (0.25 mg/kg/day on days 1 through 3 and 0.5 mg/kg/day on days 4 through 10).

Patients qualifying for the participation in the study at visit 1 (day 1, randomisation—first dose) have been admitted to the clinic at 2 out of 3 visits, according to a patient-specific PK sampling scheme. Due to the requirement of sparse sampling, each patient will contribute a total of 5 PK samples.

Sleep latency and total sleeping time have been recorded by actigraphy starting from 3 consecutive days prior to visit 1 up to the end of the treatment.

An interim analysis has been performed after completion of 18 patients to assess whether data collected allows the determination of the relevant PK parameters with the appropriate precision. The 18 patients are so distributed according treatment arms: 3 patients in treatment arm 1, 5 patients in treatment arm 2, 10 patients in treatment arm 3.

Preliminary Conclusions of Pharmacokinetics:

The pharmacokinetics of trazodone could be described using a population pharmacokinetic model based on adult data. Inter-individual variability in clearance estimates was found to be considerably higher than what has been observed previously in adult subject. Overall, the pharmacokinetics of trazodone was dose-proportional and no deviations were observed, which would suggest additional sources of variability in drug disposition, in the pediatric population Preliminary Conclusions: PKPD Correlations Actigraphy data showed that despite having a diagnosis of insomnia, sleep latency time was zero in many patients at baseline. Exploratory analysis of the data shows that a significant proportion of patients included into the study has total sleep time high at baseline (>7 hours). Detection of treatment effect may be more difficult in this subgroup of patients.

Despite all these considerations, correlations were observed between secondary PK parameters and relative change from baseline in total sleep time. Primary PK parameters for trazodone after single and repeated oral administration of trazodone include apparent oral clearance (CL/F), apparent volume of distribution (Vd/F) and absorption rate constant (Ka). Secondary parameters are derived from model predicted profiles: area under the plasma concentration curve extrapolated to infinite time (AUC), maximum plasma concentration (Cmax), minimum plasma concentration (Cmin), maximum plasma concentration at steady state (Css), Trough plasma concentration (Ctrough), time at which Cmax is reached (Tmax).

Evaluation of the cumulative total sleep time suggests a slightly longer sleep time in patients showing higher exposure to trazodone. The increase in total sleep time is evident by the shift in total sleep time distribution at visit 3, during which a small proportion of patients assigned to 0.4 and 0.5 mg/kg dose reached total sleep time >9 hours.

Example 5. Therapeutic Scheme (Prophetic Example)

Different therapeutic schemes and dosages will be defined for the treatment of acute and chronic insomnia depending on the target NDD population, as follows:

Different therapeutic schemes and dosages will be defined for the treatment of acute and chronic insomnia depending on the target NDD population, as follows: 0.2-0.6 mg/kg/day, preferably 0.4-0.6 mg/kg/day for patients aged 2 to 17 years (up to the $18^{th}$ birthday).

However, given the chronic nature of insomnia in NDD, and since trazodone has proven effective already in the first days of use (Jaffer K Y, Chang T, Vanle B, et al. Trazodone for Insomnia: A Systematic Review. Innov Clin Neurosci. 2017; 14(7-8):24-34), trazodone can be used with greater results in a chronic therapeutic regimen and re-evaluated periodically based on patients needs.

The invention claimed is:

1. A method for treating insomnia in a pediatric patient affected by a Neurodevelopmental Disorder (NDD), comprising administering to a pediatric patient in need thereof a trazodone dose of from 0.2 to 0.6 mg/kg patient.

2. The method according to claim 1, wherein the treatment is chronic.

3. The method according to claim 1, wherein the NDD is selected from the group comprising: Autism Spectrum Disorder (ASD), Intellectual disability and Attention Deficit Hyperactivity Disorder (ADHD).

4. The method according to claim 1, which comprises the administration once a day.

5. The method according to claim 1, wherein said administration is before bedtime.

6. The method according to claim 1, which comprises the co-administration of at least one drug selected from the group consisting of a first generation antipsychotic, a second generation antipsychotic, an antidepressant, a benzodiazepine, an antiepileptic, a mood stabilizer, a psychostimulant, an antispasmodic, and atomoxetine.

7. The method according to claim 1, which comprises the co-administration of at least one drug selected from the group consisting of haloperidol, olanzapine, amitriptyline, lorazepam, gabapentin, lithium, methylphenidate, biperiden, and atomoxetine.

* * * * *